United States Patent Office 3,332,501
Patented July 25, 1967

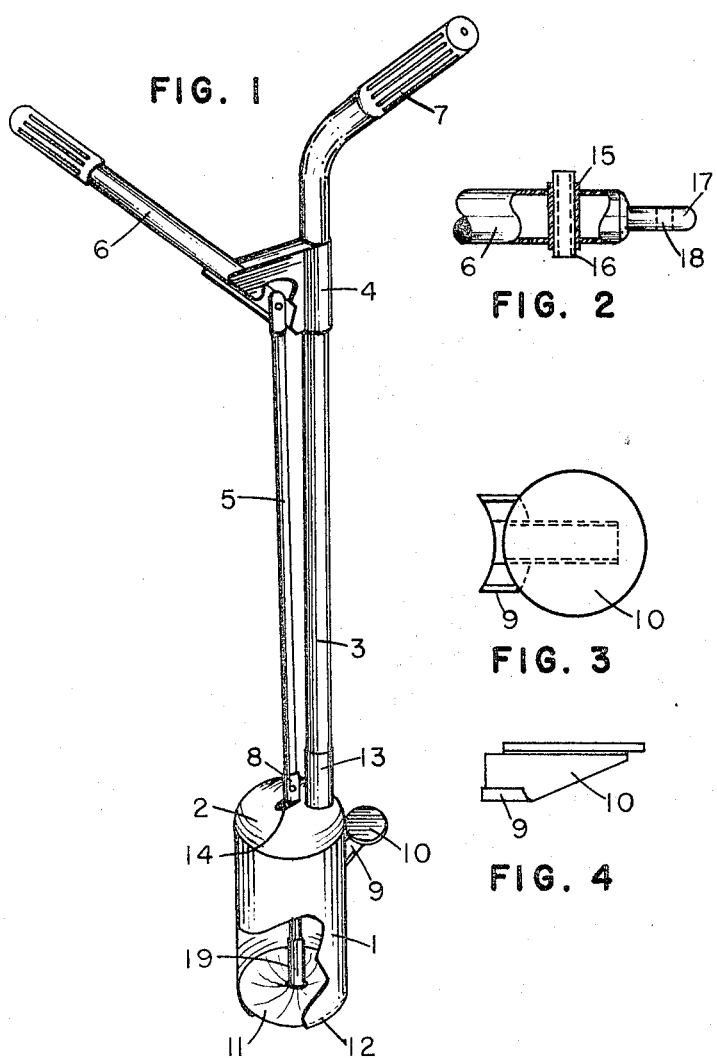

3,332,501
RECIPROCAL SOIL PLUG CUTTER
Roy Parish, 2859 Thornhill Drive,
Mobile, Ala. 36606
Filed Jan. 11, 1965, Ser. No. 424,792
1 Claim. (Cl. 172—19)

ABSTRACT OF THE DISCLOSURE

An implement for removing plugs of soil from the ground employing a tubular cutting member adapted for manual insertion into the ground and provided with an inverted dome-shaped ejector plate slidably mounted within the cutting member and actuated by a hand lever pivotally connected to the implement.

This invention relates to an improvement in soil penetration tools, particularly for the repair of established lawns, wherein bare spots occurring are removed with a device, boring in a reciprocal motion, by yieldingly depressing downwardly into the soil, thereby, forming a circular earthen turf plug inside the cylinder cutter of the device which is readily displaced by moving a lever member upwardly. Procedural operation for cutting is to simply grasp the hand grip and apply pressure on foot pedal while holding the lever member horizontally and moving it back and forth forcing cutter into the soil.

It is an object of this invention to provide a device which has effective means of soil penetration by reciprocating cylindrical cutter affixed by a cup shaped member provided with an upright torsional shaft and hand grip, also providing a support mounting bracket for pivotal bearings of a lever member to actuate the upward and downward movement of a push rod and piston disk inside the cylindrical cutter walls. A foot pedal for exerting a downward pressure is combined with a horizontal formed lip depth stop, limiting extent of soil penetration.

With these and other objects in view, this invention involves certain novel features of construction, combination and arrangement of parts to be hereinafter more fully described and claimed.

For a more complete understanding of my invention reference is to be had to the following description and accompanying drawings in which:

FIGURE 1 is a perspective of the invention with parts broken away.

FIGURE 2 is a top elevation view with parts broken away.

FIGURE 3 is a top elevation view of the foot pedal.

FIGURE 4 is a side elevation view.

The drawings show a device comprising a cylindrical formed cutter 1 having a cup-shaped member 2 including a fixed upwardly projecting tubular boss 13 offset from the longitudinal axis of the cutter 1. The cup 2 is provided with a radial slot 14 to receive a vertically moveable push rod 5, and the lower end of the cutter has a cutting edge 12 tempered and chamfered to facilitate soil entry. A foot pedal 10, comprising a circular disk plate, is mounted on a stop lip 9 or support mounting defined by a U-shaped channel extending downwardly and horizontally outwardly and secured to the exterior of the cutter 1, the side walls each having a contoured flange extending outwardly.

A tubular torsion shaft 3 is secured within the tubular boss 13 and extends vertically, the free end being provided with an angularly extending cushioned hand grip 7. A tubular support 4 is secured to the shaft 3 adjacent its upper end and is provided with a pair of outwardly extending bracket side walls for reception of a transverse hollow spacer bearing 15. A tempered tubular bearing shaft 16 is mounted within the bearing 15 and has a length equal to the spacing of the extremity of the side walls of the bracket.

A lever 6, having a cushion grip on its outer end and an extension 17 provided with an eye 18 on its inner end, is mounted on the spacer bearing 15, the eye 18 being pivotally connected to the upper end of push rod 5 by a clevis pin retained by a cotter pin (not shown). The push rod 5 has secured on its lower extremity an upwardly-formed cup-shaped piston disk 11 to centralize thrust on a turf plug during tilting of the rod between its upper and lower movements. An adjustable sleeve bushing 8, provided with a sliding set screw (not shown), is secured on the push rod 5 whereby to abut the edges of the slot 14 to limit downward movement of the disk 11. A tubular spacer 19, positioned on the lower end of the push rod and disposed between the disk and the cup 2, limits upward movement of the push rod.

This device is a desirable instrument for those that like to putter around their yard doing certain chores. When used for the purpose intended, it will be found simple and easy to use, without the need of skill. You can start and stop your work at your own pleasure having nothing to pick up or put away. It offers a mild form of exercise and relaxation, by doing a simple job of improvement to contribute to lawn betterment.

While a specific embodiment of the invention has been shown and described, it is to be understood that all substantial equivalents thereof are considered to be within the spirit and scope of the invention.

What is claimed is:

A combined reciprocal turf plug cutter comprising:
(a) a downwardly facing cup-shaped member including a downwardly extending cylindrical wall, terminating in a cylindrical cutter member, a socket-like boss extending axially outward and off-set to the top side of said cup, said cup-shaped member providing a central radial slot aligned opposite and outwardly from said boss to accommodate with clearance a push rod member,
(b) a foot pedal extending outwardly from said wall and having at its inner extremity a lower projecting lip stop,
(c) a torsion shaft member extending upwardly from said boss and slanted at its upper termination to provide a hand grip,
(d) a support member embracing and extending outwardly from said shaft including two brackets spaced symmetrically apart a distance sufficient to accommodate with clearance a hollow pivot bearing on an intermediate portion of an actuating lever member, said brackets terminating at their upper ends in apertured portions located outwardly from said support to accommodate a hollow shaft extending between and through said apertured brackets, providing the fulcrum for the bearing of said lever member,
(e) a push rod including a fixed clevis on the upper end pivotally engaged with an end of said lever member and having limited swinging motion in said slot,
(f) a cup-like piston disk upwardly concaved and fixed on the lower end of said push rod, providing a dome-shaped lower portion to compensate for inclination of said piston rod,
(g) an adjustable stop located on said push rod to engage the radial slot when the said end of the lever member is pivoted downwardly,
(h) a piston disk spacer stop located on said push rod between the under side of said radial slot and said piston disk, the said spacer stop limiting the extent of said lever member actuation when said end of the lever member is pivoted upwardly, said lip stop limiting the downward extent of movement of the plug cutter into the turf.

References Cited

UNITED STATES PATENTS

| | | | |
|---|---|---|---|
| 411,285 | 9/1889 | Gray | 294—50.7 X |
| 509,778 | 11/1893 | Sublett | 294—50.7 X |
| 522,039 | 6/1894 | Baldridge | 111—4 X |
| 3,163,455 | 12/1964 | Tuggle | 294—50.7 X |
| 3,210,112 | 10/1965 | Glynn | 294—50.7 |

ABRAHAM G. STONE, *Primary Examiner.*

WILLIAM A. SMITH III, *Examiner.*

A. E. KOPECKI, *Assistant Examiner.*